W. S. DAVIS.
LATH-MACHINES AND PRODUCT.
No. 194,077. Patented Aug. 14, 1877.
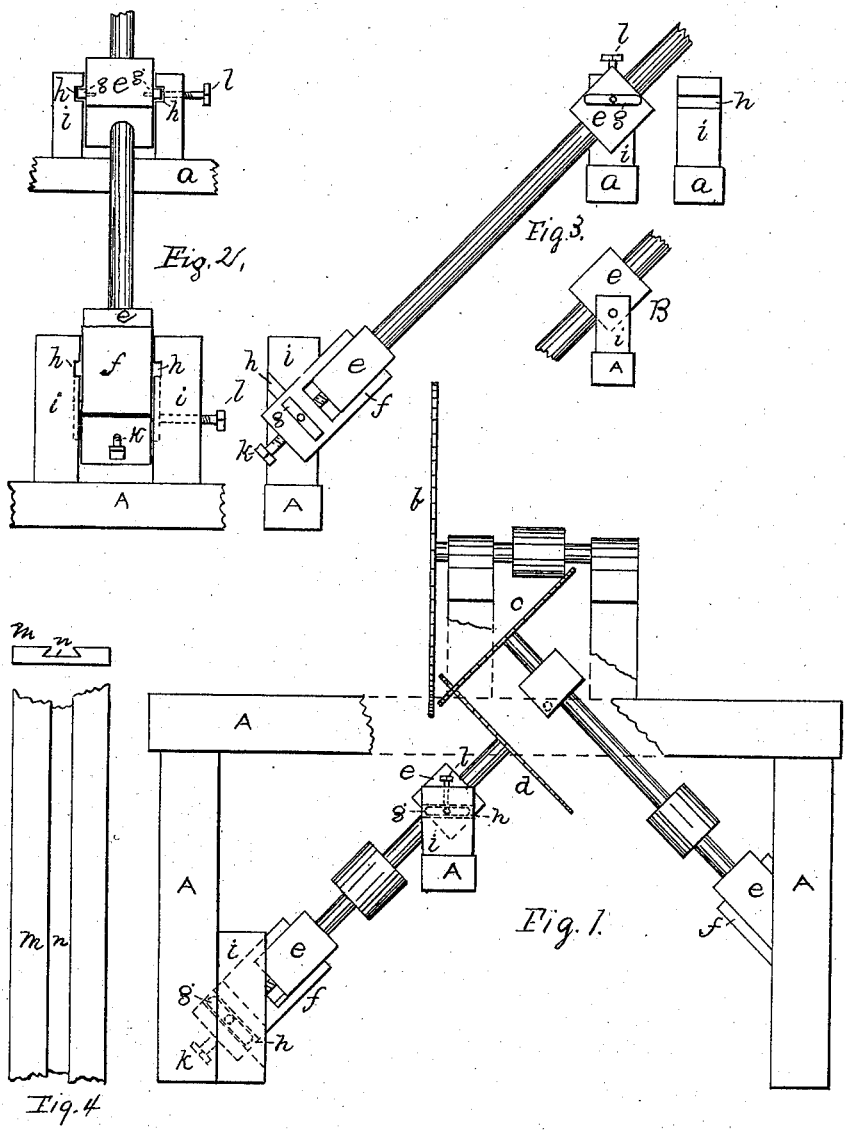

UNITED STATES PATENT OFFICE.

WILLIAM S. DAVIS, OF PITTSFIELD, MAINE, ASSIGNOR OF ONE-HALF HIS RIGHT TO WARREN L. PARKS, OF SAME PLACE.

IMPROVEMENT IN LATH-MACHINES AND PRODUCTS.

Specification forming part of Letters Patent No. 194,077, dated August 14, 1877; application filed November 16, 1876.

*To all whom it may concern:*

Be it known that I, WILLIAM S. DAVIS, of Pittsfield, in the county of Somerset and State of Maine, have invented certain new and useful Improvements in Lath-Machines and Product; and I do hereby declare that the following is a full, clear, and exact description thereof, that will enable others skilled in the art to which it appertains to make and use the same, reference being had to the accompanying drawings, forming a part of this specification, in which—

Figure 1 shows an end view of my machine; Figs. 2, 3, and B, details of the mechanism for adjusting the grooving-saws; and Fig. 4, view of lath.

Same letters show like parts.

My invention consists of a machine for the manufacture of an improved lath, said lath having a dovetail groove in its face, extending from end to end.

It further consists of said improved lath, as above described.

The novelty in said machine lies in the method of hanging the groove-cutting saws, whereby the inclination of the sides of the groove may be varied and the wear of the saws compensated for. This will be fully understood by reference to the accompanying drawing.

A represents the frame of the machine, having a table, as common. At $b$ is the saw for splitting out the laths, in front of which, at $c$ $d$, are the saws for cutting the groove in the lath, one in front of the other, their surfaces being inclined at opposite directions. All the saws are run in the usual manner.

The grooving-saws are made adjustable, as follows: The box $e$, in which the arbor runs, is inclosed in a casing, $f$, within which it is capable of a longitudinal sliding motion, regulated by a set-screw, $k$, in said casing acting upon the bottom of the box $e$.

Upon each side of the casing are pivoted slides $g$, fitting into grooves $h$ in stationary uprights or supports $i\ i$.

When the inclination of the saw is to be varied the pivoted slides $g$, turning on their pivots, as well as moving in the grooves $h$, permit the saw-arbor to be inclined more or less, as desired, accommodating themselves to its movement. Set-screws $l$ are provided, by which the arbors may be fixed in any position.

I prefer to have both the boxes in which the arbors of the grooving-saws run provided with the casing and pivoted slides, as it insures greater accuracy of adjustment.

The slides $g$ may, however, be applied directly to the sides of the upper box, as at $m$, the longitudinal adjustment being provided for in the lower box.

Good results may, however, be obtained by the use of one casing and set of slides at the lower end of the saw-arbor, the upper box being movable upon a pivot, as shown in the detail B.

My lath is intended to be applied in the same manner as the lath now in common use, spaces being left between adjoining laths, into which the plaster penetrates, as usual.

The dovetail groove is an additional security, preventing the plastering from becoming loose and falling off, furnishing extra fastenings therefor.

The lath is shown at $m$, the groove therein at $n$.

The machine, as will be readily understood, saws the lath and grooves it at the same time, the saws $c\ d$ cutting the inclined sides of the groove, enabling the central strip to be readily removed.

I do not claim the devices shown in the patent of E. L. Jones and M. E. Carter, No. 33,087, nor those shown in M. S. Norton's patent of March 16, 1875, No. 160,838; nor do I claim the combination of vertical and inclined saws. My invention relates particularly to devices for rendering my inclined saws adjustable for the purposes set forth herein. Neither do I claim a close sheathing channeled or grooved for the reception and retention of the plaster, and retaining said plaster wholly by means of said grooves or channels, as shown in the patents of J. L. Bralyn, No. 17,550, of 1857, and D. Phillips, No. 45,936, of 1865. My lath is the ordinary lath applied as common, preserving the interstices, as usual, between contiguous laths, but with the further and additional device (the groove) to give extra security, and not as a mere substitute for the spaces.

What I claim as my invention, and desire to secure by Letters Patent, is—

1. In a sawing-machine, the combination of the grooving or beveling saws $c\ d$, with boxes $e$, casings $f$, pivoted slides $g$, and standards or supports $i\ i$, having grooves $h$ therein, all arranged and operating as set forth, for the purposes specified.

2. A lath, $m$, intended for use in the ordinary manner, provided with a dovetail groove, $n$, in its face, substantially as and for the purposes specified.

In testimony that I claim the foregoing I have hereunto set my hand this 11th day of November, 1876.

W. S. DAVIS.

Witnesses:
W. L. PARKS,
WM. FRANKLIN SEAVEY.